April 28, 1931. T. A. APPIA 1,802,492
EDUCATIONAL APPLIANCE
Filed Nov. 20, 1929 3 Sheets-Sheet 1
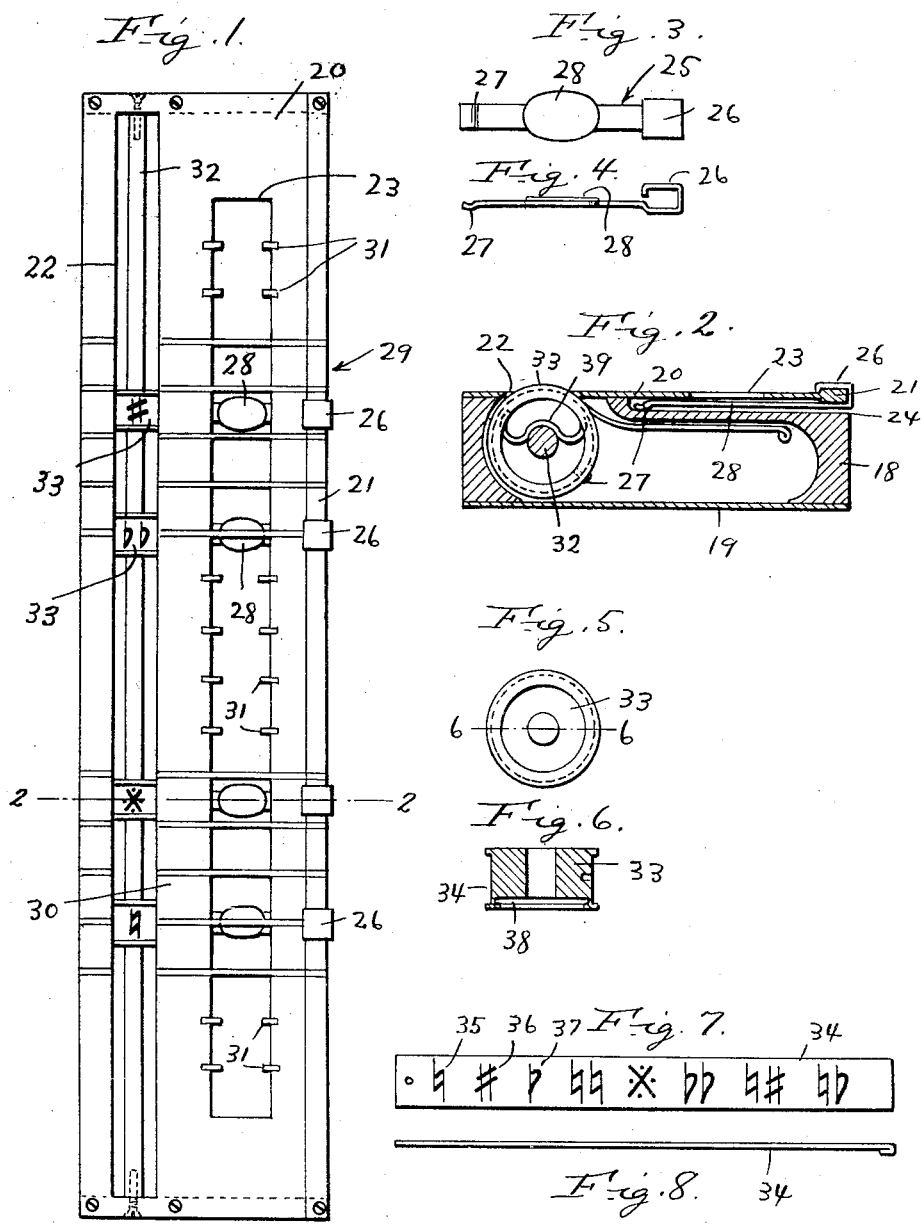
Inventor
Theodore A. Appia
By Clarence A. O'Brien
Attorney April 28, 1931. T. A. APPIA 1,802,492
EDUCATIONAL APPLIANCE
Filed Nov. 20, 1929   3 Sheets-Sheet 2
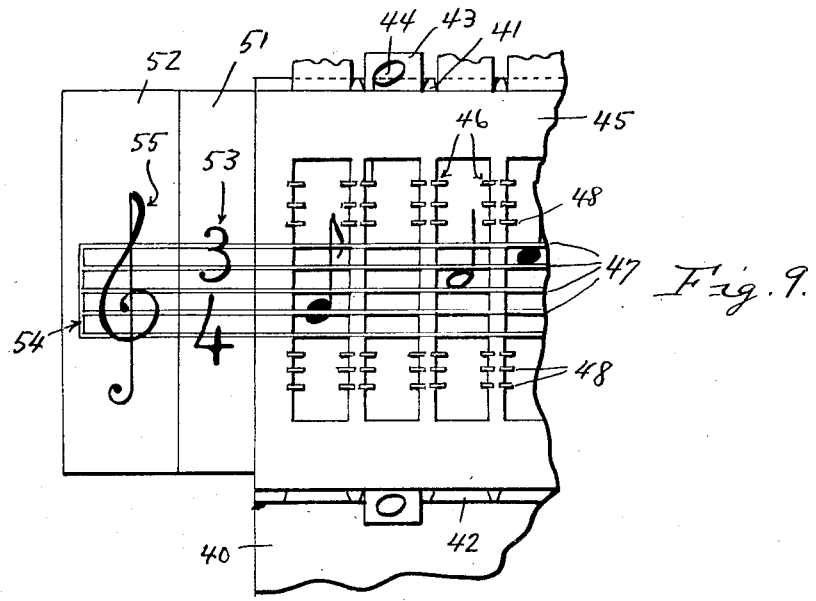
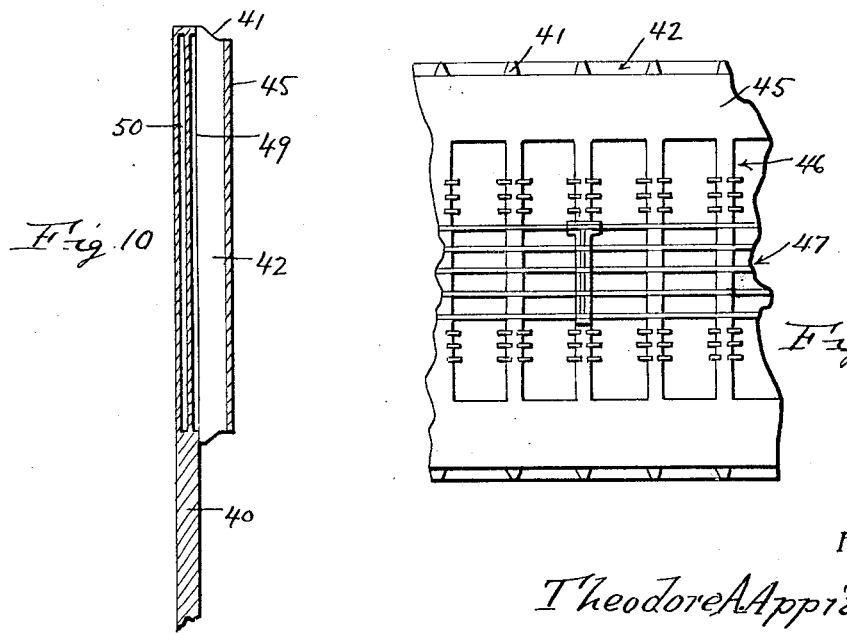
Inventor
Theodore A Appia
By Clarence A O'Brien
Attorney

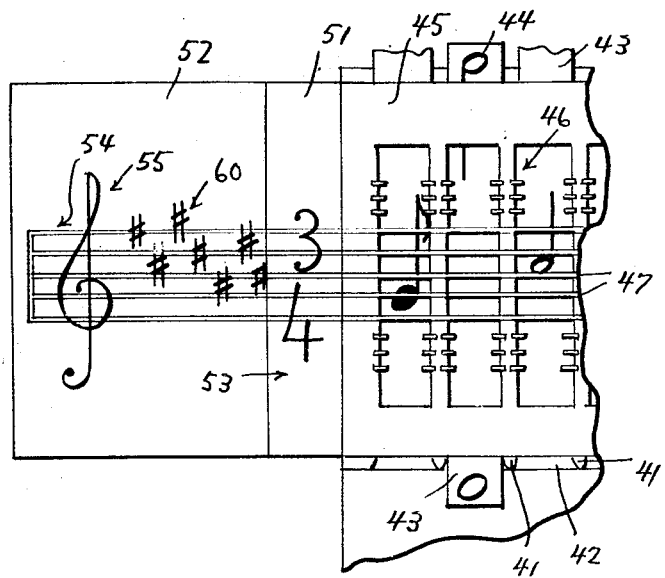

Patented Apr. 28, 1931

1,802,492

UNITED STATES PATENT OFFICE

THÉODORE A. APPIA, OF ELIZABETH, NEW JERSEY

EDUCATIONAL APPLIANCE

Application filed November 20, 1929. Serial No. 408,627.

This invention relates to an improved educational appliance in the nature of a musical notation chart, characterized by a novel arrangement of physical features cooperating in producing a means for conveniently and systematically teaching and studying music by creative means.

The present application is a continuation in part of a co-pending application for a similar appliance designated by Serial No. 368,846, filed by me under date of June 6, 1929.

More specifically stated, I have evolved and produced a device which may be used by the teacher on a large sized structure, or by the pupil or student on a small sized structure, in studying the fundamentals of music and musical notations, with a view toward learning rhythm, melody, harmony, polyphony, ear training and sight reading.

I have evolved and produced a novel mechanical structure including graphically depicted and properly charted features cooperating in providing a structure, which offers the advantages of private instruction and which enables children of kindergarten age to acquire a working knowledge of the fundamentals of music.

By the use of the invention, all of the rudimentary principles of music may be taught in a creative way by actual experience of handling the physical elements of the device. Not only may all fundamentals be taught, but they may be brought into practice. Thus it is possible through the medium of the device to acquire ear training and sight reading as well as to learn rhythm, melody, polyphonic and harmonic composition.

The device is constructed to be used by the teacher or pupil or both and includes a substantially game-like structure, which is fascinating and combines play with study, thus permitting the student's creative sense to be awakened.

The device is recreational, since the novelty of the details creates a sense of interest and draws the child to learn the rudiments of musical notation at the very beginning, thus making it applicable and especially useful for school room use or home use, whichever is desired.

The particular structural details and their specific association and arrangement will become more readily apparent from the following description and drawings.

In the drawings:—

Figure 1 is a top plan view of a distinguishable embodiment of the invention, as constructed in accordance with the novelty of the present application.

Fig. 2 is a transverse sectional view on the line 2—2 of Fig. 1.

Fig. 3 is a plan view of a musical notation slide.

Fig. 4 is an edge view of the same.

Fig. 5 is an end view of an indicia drum which is slidably and rotatably mounted in the structure seen in Fig. 1.

Fig. 6 is a cross section through the same on the line 6—6 of Fig. 5.

Fig. 7 is a plan view of an indicia band or strip which is associated with the drum seen in Fig. 5.

Fig. 8 is an edge view of Fig. 7.

Fig. 9 is a fragmentary plan view of a slightly different embodiment of the invention, analogous to the form of the invention shown in the co-pending application identified at the introductory portion of the application.

Fig. 10 is an edge view of the structure in Fig. 9, observing the same in a direction from right to left, with the signature cards removed.

Fig. 11 is a top plan view of Fig. 9, with the cards removed and with the note slide removed, showing a detachable measure bar element in place on the staff.

Fig. 12 is a view similar to Fig. 9, showing one of the cards extended to expose a plurality of sharps.

Fig. 13 is a detail view of the detachable element which forms the measure-producing bar on the staff.

Fig. 14 is a fragmentary view showing springs included in the guideways for the slides in aiding and holding the slides in adjusted position.

Fig. 15 is a fragmentary view of the structure seen in Fig. 14.

Fig. 16 is a detail view of one of the retaining springs.

Fig. 17 is an edge view of the device shown in Fig. 13.

Attention is first invited to Figs. 1 to 8 inclusive wherein it will be seen that the appliance comprises a substantially rectangular portable structure, somewhat in the nature of a game box. As shown for example in Fig. 2, it includes a body portion 18 in the nature of a block of appropriate material. This is hollowed out to provide an internal compartment to accommodate the internal mechanism.

The reference character 19 designates a bottom plate and 20 indicates a top panel. Along one edge, this panel is formed with a thickened guide rib 21. Along the opposite edge it is formed with an elongated slot 22 and near the right hand edge it is formed with a similar slot 23. It will be noticed in Fig. 2 that the panel is spaced above the block to provide a channel 24 in which the slides 25 are adjustable. I provide any number of slides, and each one includes a loop 26 which is slidable on the bar 21 and a terminal end 27 which constitutes a shoe and is slidable along the bottom of the channel 24 as seen in Fig. 2. On the intermediate portion is an oval-shaped tab 28 which constitutes a musical notation.

These slides are adjusted with respect to the lines and spaces of the staff. In this connection I invite attention to the fact that the reference numeral 29 designates generally the treble staff and 30 represents generally the bass staff, whereby to permit a single device to facilitate teaching of musical notation in both bass and treble. The numerals 31 designate additional lines above and below the respective staffs, commonly referred to as ledger lines.

It is obvious that the notes 28 are visualized through the slots 23 and are placed in different relative positions by properly adjusting the slides 25 in an obvious manner.

Attention is now invited to the numeral 32 in Fig. 1 which represents the guide rod fastened in the body to register with the slot or sight opening 22. This rod accommodates a plurality of symbol indicators which are here preferably in the nature of spool-like drums 33. I provide any number of these and they are slidably mounted on the rod to cooperate with the lines and spaces of the respective staves.

Each device 33 is in the nature of a spool having its periphery grooved as at 34 to accommodate a flexible band 35 provided with the various symbols. For instance as shown natural at 35, sharps at 36, flats at 37 and so on, and if these desired, these symbols might well be formed on the periphery of the spool itself to be seen through the slot.

I also call attention to an annular groove 38 formed in the face of the drum, receiving the end portion of a flexible retaining spring 39 which is constructed to frictionally engage the guide rod 32 as shown in Fig. 2. This allows the devices 33 to be shifted to any desired position and retained in this position, and at the same time to be rotated to bring into view the desired sharps, naturals, flats, or the like, in an obvious manner.

As before stated, the use of a game-like device of this particular type, permits all of the rudimentary principles of music to be taught in a creative manner by actual experience of handling the various details and elements of the device in an easy and unmistakable manner.

Not only are the fundamentals taught, but they are actually brought into practice. Thus, it is possible that through the medium of a device of this particular type to acquire ear training and sight reading and to learn rhythm or melody, etc.

Attention is now invited to the embodiment of the invention represented in Figs. 9, 10, 11, and 12 inclusive. Here, the reference character 40 designates a base board provided on its front with a plurality of longitudinally extending and spaced cleats 41 defining individual guideways 42 for reception of slides 43 carrying indicia in the form of musical notations 44.

The notes may be whole notes, half notes, quarter notes and so on, as in the co-pending application previously mentioned. The reference character 45 designates a panel which is cut out at longitudinally spaced points to provide sight openings as at 46 through which the notes are visible. The reference characters 47 designate the lines of the staff which intersect the sight openings. The reference numerals 48 designate lines above and below the staff, commonly referred to as ledger lines.

The slides are adjusted to bring the notes in communication with the sight openings 46 and in registry with the lines and spaces of the staff. As seen in Fig. 10 the reference characters 49 and 50 represent receptacles for the cards 51 and 52 respectively.

These cards are formed with staffs whose lines register with the lines of the staff on the panel 45. The card 51 is provided with indicia as at 53 for designating time, for instance three-four time; four-four time and so on. The staffs 54 on the card 52 is provided with a clef signature as at 55 as in Fig. 9, and at 60 with the symbols representing sharps, flats, etc. The card may be drawn out to expose one sharp, two sharps, three sharps, and so on.

On the opposite sides (not shown) are the flats. The difference in structure here, as compared to the structure represented in the co-pending application is in the provision of the cards 51 and 52 provided with the additional indicia for facilitating the designation of time, clefs, and key signature.

In Fig. 14 the reference characters 61 designate springs carried by the aforesaid cleats 41, these springs being of longitudinally bowed formation and projecting into the guideways to aid in holding the slide 43 in adjusted position.

The device represented by the numerals 62 in Figs. 13 and 17 is a measure forming bar. This is detachable and comprises a strip 63 of appropriate material having painted thereon the bar representation 64 and the line 65 for registration with the lines of the staff. The reference numerals 66 designate the suspension hooks which are engaged over the staff as seen in Fig. 11. The reference numerals 67 designate the finger strip for facilitating manipulation of this device 62.

In the further description of the device, the only other feature to be mentioned is the arrangement seen in Fig. 15, wherein it will be observed that the base board 68 carries inner and outer guide channels 69 and 70 for reception of the aforesaid slides 43 thus permitting the slides to be arranged in superposed relation for compactness and convenience, and arrangement of structure.

Here, I also show the spring 61 in the channels for holding the slides in place. From the foregoing description and drawings it will be seen that I have evolved and produced a novel game-like educational appliance especially adapted for teaching musical notations. By use of the individual elements with the divert musical symbols thereon an unlimited amount of musical rhythmical combinations are obtainable, the same being composed by the pupil or the teacher, or taken from a fixed set of exercises in an evident manner.

The device may be used by any teacher or under any system of teaching whatsoever. Under the teaching of the device, the pupil may study chords in a manner other than the standard method of teaching chords by fixed combinations of notes. The pupil may employ his or her creative imagination in the study of these harmonic cadences.

The movable parts of the structure especially of Fig. 1, are an aid in the mastery of chord studies, since the pupil recognizes and understands tonal differences by the space of the movement of the individual parts of the device. The employment of the device by the pupils in creative compositions, aids ear training, in that the melody is imagined beforehand in the mind of the child.

The study of intervals becomes simple by the use of the device, since the notes in the intervals may be changed with great speed and facility.

The materials that may be used in the construction may be metal, aluminum, wood, fiber, or otherwise. The body portion may be black with a white colored staff or vice versa. Different color schemes may be used for attractiveness and interest.

The structure involves the utilization of painted, printed, or other forms of notes, rests, musical symbols, and all sorts of characters. By the system of cards and characters, and separable and individual insertions, no fixed or standard set of musical indicia is needed. The teacher may give original examples or have the pupils compose them on the individual appliances. Both the teacher and pupil may have separate devices. Moreover, the device is usable in a practicable manner for teaching both vocal and instrumental music.

Minor changes in shape, size, materials, and re-arrangement of elements coming within the field of invention claimed, may be resorted to in actual practice if desired.

Having thus described my invention, what I claim as new is:—

1. In a structure of the class described, in combination, a body having a guide channel formed in its top and an elongated sight opening overlying said channel, a plurality of note equipped indicators slidably mounted on the body and movable in said channel, and staff lines intersecting said sight opening and overlying the said channel and permitting the notes to be adjusted with respect to the spaces of the staff.

2. In a structure of the class described, in combination, a body, a panel fastened to the top of said body and including an elongated slot forming a sight opening and provided along one edge with an enlarged guide rib, a plurality of finger-like indicators including loops slidable on said rib and further including note indicia in registry with said slots, the panel being provided with a musical staff whose lines and spaces intersect said slot.

3. In a structure of the class described, in combination, a body, a panel fastened to the top of said body and including an elongated slot forming a sight opening and provided along one edge with an enlarged guide rib, a plurality of finger-like indicators including loops slidable on said rib, and further including note indicia in registry with said slot, said panel being provided with a musical staff whose lines and spaces intersect said slot, said panel being also formed with a second elongated sight opening, a rod mounted in said body in alinement with said last-named sight opening, and a drum-like indicator slidably and rotatably mounted on said rod and having its peripheral portion provided with indicia having registration with last named sight opening and for co-relation with the lines and spaces of the staff.

4. In a game-like educational appliance of the class described, a base, a block-like body mounted on said base, said body being of hollow form and provided at its top with a recessed portion providing a guide channel, a panel attached to said body and including spaced parallel longitudinally extending slots defining individual sight openings, said panel also including upper and lower staves whose lines intersect said sight openings, individual slides carried by said panel and cooperable with one of said sight openings, a rod in said body in registry with the remaining sight opening, and indicia equipped drums slidably and rotatably mounted on said rod.

In testimony whereof I affix my signature.

THÉODORE A. APPIA.